United States Patent [19]
Abraham et al.

[11] 3,982,983
[45] Sept. 28, 1976

[54] CONTROLLED BONDING OF FLUOROELASTOMERS TO METAL SUBSTRATES

[75] Inventors: John C. Abraham, Metamora; Gary L. Grebner, East Peoria; William D. Brandon, Peoria; John Jero, Washington, all of Ill.

[73] Assignee: Caterpillar Tractor Co., Peoria, Ill.

[22] Filed: Apr. 22, 1975

[21] Appl. No.: 570,322

[52] U.S. Cl. .............................. 156/154; 156/306; 156/556; 156/322; 427/209; 427/379; 427/318; 427/388 A; 428/421
[51] Int. Cl.² .................... B32B 31/00; C09J 5/00; C09J 7/00
[58] Field of Search ........... 156/153, 154, 244, 245, 156/306, 309, 312, 322, 366, 497, 498, 499, 500, 556, 583; 428/421, 422, 469; 264/82, 162, 236, 265, 331, 347; 260/87.7, 92.1, 42.27, 884, 900; 427/209, 379, 318, 388 A

[56] References Cited
UNITED STATES PATENTS

| | | | |
|---|---|---|---|
| 2,549,935 | 4/1951 | Sauer | 260/87.7 |
| 2,955,974 | 10/1960 | Allen et al. | 428/469 |
| 3,300,353 | 1/1967 | Hernick | 156/154 |
| 3,408,252 | 10/1968 | Manganello et al. | 428/469 |
| 3,501,360 | 3/1970 | Mancel | 156/153 |
| 3,575,762 | 4/1971 | Goehring et al. | 156/306 |
| 3,679,498 | 7/1972 | Anderson | 156/153 |

FOREIGN PATENTS OR APPLICATIONS
1,022,167  3/1966  United Kingdom ................ 156/306
864,812    4/1961  United Kingdom ................ 156/306

OTHER PUBLICATIONS
"Poly(vinylidene Fluoride)Elastomers" Thompson et al. Kirk–Othmer ect. vol. 21, pp. 269–275, 1970.

*Primary Examiner*—Douglas J. Drummond
*Assistant Examiner*—J. J. Gallagher
*Attorney, Agent, or Firm*—Phillips, Moore, Weissenberger, Lempio & Strabala

[57] ABSTRACT

Fluoroelastomers, particularly ultra high temperature thermally stable fluoroelastomers are bonded to a metal substrate by forming a roughened bonding surface on one side of the substrate, controllably oxidizing the substrate at a temperature sufficient to cause the formation of an oxide coat on said bonding surface but below the tempering temperature of the substrate, adjusting the substrate to a temperature above the softening temperature of the fluoroelastomer, adhering the fluoroelastomer which includes a minor amount of an alkaline earth oxide dispersed therein, heated to a temperature sufficient to initiate curing thereof, directly onto said bonding surface, and expeditiously compressing said fluoroelastomer between said bonding surface and a mold face maintained at a temperature closely adjacent to the temperature of the substrate.

13 Claims, 6 Drawing Figures

FIG_1

FIG_2

FIG_3

FIG_4

FIG_5

FIG_6

3,982,983

CONTROLLED BONDING OF FLUOROELASTOMERS TO METAL SUBSTRATES

BACKGROUND OF THE INVENTION

1. Field of the Invention

The invention relates to controlled bonding of thermosetting fluoroelastomers to metal substrates with concurrent curing of said fluoroelastomers. More particularly, the invention relates to a method of controllably bonding fluoroelastomers directly to metal substrates while concurrently uniformly curing the fluoroelastomers without the use of added adhesive therebetween. The fluoroelastomers of this invention are typically relative chemically inert, thermally stable polymers, owing primarily to the strength of the carbon-fluorine bonds present in the molecules. Because of the thermal stability of these molecules, the fluoroelastomers are desirable in many applications which require elastomeric materials which will withstand high bulk temperature moduli. However, a great number of these applications, particularly in mechanical fields, require the elastomer to be used in conjunction with stiffening, or backup members, most often fabricated from metal, and hence require a method of bonding the elastomer to the metal member which will provide a bond capable of withstanding high temperatures and sustained or heavy loading. Particular examples include clutch plates and brake linings, where high friction coefficients result in very high ambient temperatures; many other examples will be apparent.

Unfortunately, the inherent properties of the fluoroelastomers, in particular chemical inertness, have made it difficult and, in some instances, impossible to effectively adhere uniform layers of these fluoroelastomers to a metal substrate, especially where high shear or impact strength is required in the finished fluoroelastomer-metal laminate, or where the finished laminate will be exposed to high ambient temperatures. The problem of bonding the ultra high temperature thermally stable thermosetting fluoroelastomers without at the same time reducing the uniformity of the layers thereof has been particularly troublesome.

2. Prior Art

Prior art methods which have been employed for bonding some types of fluoroelastomers to metal substrates have most commonly involved chemical bonding of the fluoroelastomers to the metal substrate with an adhesive bonding agent therebetween. These methods have limited application, however, since with both structural and non-structural adhesives, the bond achieved is not generally capable of withstanding sustained or heavy loading, or high ambient temperatures. Further, the adhesive bonding agent is highly subject to scuffing and wiping during molding of the product, which deactivates or destroys this agent, and therefore molding techniques and mold configurations for fluoroelastomer-metal laminates have heretofore been highly restricted.

SUMMARY OF THE INVENTION

The invention comprises both a unique process and a unique apparatus for forming in a controlled manner a cured uniform fluoroelastomer layer directly bonded to a metal substrate.

The process of the present invention comprises forming a first roughened bonding surface on one side of a metal substrate, oxidizing the substrate at a temperature sufficient to cause formation of an oxide layer on said first roughened bonding surface but below the tempering temperature of the substrate and adjusting the temperature of the substrate to a temperature, T, above the softening temperature of a thermosetting fluoroelastomer. The thermosetting fluoroelastomer, which must contain a minor amount of CaO and is at a temperature sufficient to initiate curing thereof, is adhered directly onto the first roughened surface. Then the fluoroelastomer is quickly compressed between said first roughened surface and a first mold face maintained at a temperature critically maintained to be closely adjacent the temperature, T, of the metal substrate.

The apparatus of the present invention, comprises means for forming a first roughened bonding surface on one side of a metal substrate, means for oxidizing the substrate at a temperature below the tempering temperature of the substrate and sufficient to cause formation of an oxide layer on said first roughened bonding surface and means for adjusting the temperature of said substrate to a temperature, T, above the softening temperature of a thermosetting fluoroelastomer which includes a minor amount of CaO dispersed therein. The apparatus further includes means for placing the fluoroelastomer directly onto said first roughened bonding surface. Also a part of the apparatus is a first mold face critically maintained at a temperature closely adjacent the temperature of said substrate and means for compressing the fluoroelastomer between the first roughened bonding surface and the first mold face.

Generally, it is necessary that the compressing of the fluoroelastomer between the metal substrate and the mold face take place before the fluoroelastomer has significantly bonded to the first roughened surface. It is further necessary that the fluoroelastomer have dispersed therein a minor amount of CaO which provides the fluoroelastomer with strong bonding abilities when directly applied to said first roughened bonding surface.

DETAILED DESCRIPTION OF THE PROCESS OF THE INVENTION

According to the process of this invention, thermosetting fluoroelastomers are compounded with small amounts of calcium oxide. The compounded CaO-fluoroelastomer is then heated to a temperature sufficient to initiate slow curing thereof, adhered to the metal substrate and concurrently cured and bonded to the substrate.

Thermosetting fluoroelastomers that are particularly benefited by addition of CaO are those commercially available copolymers of hexafluoropropylene and vinylidene fluoride, known variously as Viton E60, E60C and LD 2873, commercially available from E. I du Pont De Nemours and Company, Wilmington, Del., and Fluorel 2160, 2170, and FC 2170, commercially available from 3M Company, St. Paul, Minn.

Broadly, the invention comprises incorporating an amount of calcium oxide, conveniently in powdered form, into the uncured thermosetting fluoroelastomer to achieve an even dispersion of the CaO therein, adhering the compounded fluoroelastomer heated to a temperature sufficient to initiate relatively slow curing thereof to a pretreated metal substrate, and then quickly compressing the fluoroelastomer against a mold face in a particularly controlled manner whereby curing of the fluoroelastomer and bonding thereof to the substrate occur quickly and at comparable rates. The laminate obtained thereby is then usually post-cured for a sufficient period of time at elevated temperatures to impart the desired bond strength and obtain the desired physical properties in the cured fluoroelastomer.

It is necessary to pretreat the metal substrate to provide a surface on the substrate receptive to the bond. This can be accomplished, for example, by sandblasting the bonding surface of the substrate, and then oxidizing the sandblasted bonding surface. To achieve a satisfactory bond, the oxidized surface of the metal should be substantially free from foreign substances, including oil or grease.

The compounded fluoroelastomer is bonded to the metal substrate and simultaneously cured by a compression molding technique. It is essential to the practice of the invention that the temperature of the mold be quite near the temperature of the metal substrate. The fluoroelastomer is then generally cured at elevated temperatures while in intimate contact with the metal bonding surface whereby it is simultaneously bonded thereto; adequate pressure is maintained on the elastomer/metal substrate unit during curing to insure a bond at least sufficient to permit demolding of the laminate.

It is preferred that the metal substrate have a first roughened bonding surface prepared thereon as by treating the substrate by sandblasting to produce a medium-rough bonding surface; this may conveniently be accomplished by blasting the metal surface with a suitable abrasive. For example, a steel member may be satisfactorily roughened by blasting the bonding surface with $Al_2O_3$ particles having a grit of about 40 to 180, preferably 50 to 80, to produce a surface roughness of about 20 to about 250 microinches rms (As defined in "The Story of Superfinish" by Arthur A. Swigert, Jr, Lynn Publishing Co, Detroit, 1940), preferably 20 to 40 rms. Other abrasives of larger or smaller grit may be found to be more suitable for use in conjunction with other metals, however, or for use in bonding applications other than those specifically illustrated herein.

The sandblasted metal substrate is then treated to controllably oxidize the first roughened/bonding surface thereof. In the case of iron alloys, for example, heating in a forced air oven for from about 1 hour up to about 6 hours at about 300° to 350°C and usually with at least 0.5 air changes per minute, and more preferably at least 1 air change per minute produces a surface oxidation satisfactory for the purposes of this invention. In the case of iron based alloys such as steels and the like, the surface oxidation is believed to produce a ferrous oxide, i.e., $FeO$ and/or $Fe_3O_4$, which is thought to form direct chemical bonds, probably via an iron-oxygen bridge to the fluoroelastomer. Generally, broad ranges of temperatures, for example, from about 150° to about 550°C, with the time varying accordingly, are employable to produce adequate surface oxidation of the metal substrate during heating. The temperature during heating should be kept generally below the tempering temperature of the substrate to avoid changes in the properties, i.e., hardness, ductility and the like, thereof.

The temperature of the substrate is then adjusted, generally by cooling, to a temperature, T, which is above the softening temperature of the thermo-setting fluoroelastomer. The temperature is also sufficient so as to initiate relatively fast setting of the fluoroelastomer. When the fluoroelastomer is, for example, the preferred commercially available copolymer of hexafluoropropylene and vinylidene fluoride, the temperature of the substrate is generally adjusted to fall within the range from about 215° to 175°C.

The thermosetting fluoroelastomer is then adhered directly onto the roughened bonding surface, said fluoroelastomer having been previously heated, as for example during extrusion thereof, to a temperature sufficient to initiate slow curing thereof. By a temperature sufficient to initiate slow curing thereof is meant a temperature high enough so that the fluoroelastomer will cure but low enough so that the following adhering and compressing operations are completed well before said slow curing significantly takes place. A substrate-elastomer bond is not allowed to form, however, until after compression is quickly applied as explained below. When the fluoroelastomer is the preferred commercially available copolymer of hexafluoropropylene and polyvinylidene fluoride, said fluoroelastomer will generally be heated to a temperature within the range from about 85° to about 115°C and more preferably in the range from about 100° to about 110°C. When the fluoroelastomer is in the desired temperature range it will adhere directly onto the roughened bonding surface, particularly if mildly compressed thereagainst. Also, preheating of the fluoroelastomer to the slow curing temperature leads to a more uniform curing thereof when compressed between the relatively hot metal substrate and mold faces since the initial temperature gradient across the fluoroelastomer layer is reduced. Working with fluoroelastomer heated to a fast cure temperature is not possible because of premature curing thereof.

The adhered fluoroelastomer is next compressed as in a mold between a mold face and the roughened bonding surface. It is essential to the practice of the present invention that the temperature of the mold face be very near the temperature of the substrate. Generally the temperature of the mold face will be within about 10°C, more preferably within about 5°C, still more preferably within about 2°C and most preferably within about 1.5°C of the temperature of the metal substrate. This is extremely important because, if there is a large temperature gradient between the mold face and the metal substrate uneven curing of the fluoroelastomer occurs leading to unpredictable and inferior physical properties for the fluoroelastomer as bonded to the roughened bonding surface.

It is important to the practice of the invention that the total elapsed time between the adhering of the thermosetting fluoroelastomer directly onto the roughened bonding surface and the compression of the fluoroelastomer between the roughened bonding surface and the mold face be kept as low as is reasonably possible. In any event, this total elapsed time should be no more than about 2 minutes, preferably no more than about 1 minute and more preferably still no more than about 0.5 minutes. If the total elapsed time between the adhering of the thermosetting fluoroelastomer directly onto the roughened bonding surface and the compressing of the fluoroelastomer between the bonding surface and a mold face exceeds these limits, it has been found that inferior bonding results. The reason for this seems to be that if more time elapses the fluoroelastomer which is adhered to the roughened bonding surface forms an initial partial bond thereto prior to the compression step. Then during the compression step the forces of compression tend to break this initial bond whereby a non-bonded area evidenced by blistering results between the fluoroelastomer and the roughened metal bonding surface in the area of the initial partial bond.

Generally it is necessary to postcure the metal bonded fluoroelastomer after the compressing step. In the preferred embodiment of the invention, this is accomplished by maintaining the metal bonded fluoroelastomer and the metal substrate bonded thereto at a temperature within the range from about 175° to about 260°C for at least about 30 minutes to complete setting of the fluoroelastomer. Preferably the fluoroelastomer is postcured from a time within the range of about 30 minutes to about 24 hours. It is preferred that the postcuring take place at temperatures in the range from about 240° to about 260°C for from about 1 to about 4 hours. Even though the preferred fluoroelastomers will cure at temperatures as low as 100°C or even slightly lower, it is important that the postcuring take place at the elevated temperatures specified and most preferably at temperatures of 240° to 260°C to insure adequate bonding to the roughened bonding surface of the metal substrate and adequate postcuring of the fluoroelastomer.

The compression step is generally carried out at a pressure within the range of about $7 \times 10^3$ kN per sq. meter to about $20 \times 10^3$ kN per sq. meter. The preferred compression pressure with the preferred fluoroelastomer is in the range from about $12 \times 10^3$ kN per sq. meter to about $17 \times 10^3$ kN per sq. meter.

After the postcuring step is completed, it is desirable to remove a skin portion of the set fluoroelastomer from the surface thereof. Generally it is preferred to remove from about 0.05 mm to about 0.15 mm of the surface of the fluoroelastomer. The reason for this is that the surface of the fluoroelastomer will tend to form a skin which differs in composition from the bulk elastomer and is very low in filler materials and this skin may cause slipping of the surface by being unduly low in friction. When the required amount of the fluoroelastomer skin is removed, this serves to expose the relatively uniform inner mass of the fluoroelastomer which would normally contain various useful filler materials as set out below.

The particular fluoroelastomer selected for bonding will depend primarily on the intended application of the bonded product. In applications where the product must withstand high bulk temperatures, one of the ultra high temperature, thermally stable fluoroelastomers such as Viton E60, Viton E60C, and Viton LD 2873, or Fluorel 2160, Fluorel 2170, and Fluorel FC 2170 will usually be selected. In some instances, it may be advantageous to combine two or more fluoroelastomers, including those of differing thermal stability properties, to obtain desired properties in the finished laminate.

The fluoroelastomer or a combination of fluoroelastomers is compounded with sufficient amounts of calcium oxide to provide a satisfactory bond between the fluoroelastomer and the roughened surface of the metal substrate under conditions of the process of this invention. Typically, from about 3 to about 15 parts CaO powder per 100 parts (php) polymer will provide a compounded fluoroelastomer formulation which will have satisfactory bonding properties. Preferably, when the ultra high temperature, thermally stable fluoroelastomers such as Viton E60C are to be compounded, a CaO concentration from about 3 php to about 7 php is used.

CaO may of course be incorporated into the elastomer in a form other than powder. A number of dispersions of CaO both in liquid and paste form are commercially available for incorporation into polymeric materials for conventional use as e.g., dessicants, curing agents, and viscosity agents. These forms of CaO may usually be substituted for the CaO powder at an equivalent actual CaO rate, provided other ingredients in these dispersions do not interfere with the bonding mechanisms.

The calcium oxide is incorporated into the fluoroelastomer by conventional mixing procedures, e.g., in a Banbury mixer, to achieve an even dispersion of the CaO throughout the fluoroelastomer. Other desired ingredients may appropriately be incorporated into the fluoroelastomer in this step, for example, curing agents and accelerators, and carbon black will usually be included. Further, to provide adequate frictional characteristics when the fluoroelastomer is to be used on clutch plates, brake plates and the like, there is generally incorporated therewithin in a homogeneous and uniform manner from about 50 to about 150 parts per hundred parts (php) of fluoroelastomer of glass fiber. "E" type (electrical grade) milled glass fiber having a $g$ or $k$ filament size ($1 \times 10^{-3}$ to $2 \times 10^{-3}$ mm diameter) with a length to diameter ratio which falls within the range from about 10:1 to about 60:1 is suitable. Preferably, from about 90 to about 130 php of glass fiber is included with the fluoroelastomer.

Cure-bond times within the compression mold from about 20 seconds at about 210°C to about 60 seconds at about 185°C are generally contemplated with the preferred fluoroelastomer set out previously. However, the cure-bond time will of course vary according to the ambient temperature, and also individual elastomers and their compounding ingredients may require varying periods of cure-bond time to effect a satisfactory cure of the fluoroelastomer and a satisfactory bond to the metal substrate. Sufficient curing-bonding conditions and adequate pressure to enable the product to be demolded as a unit are at least required. Beyond this, curing-bonding conditions may be varied according to the nature of the fluoroelastomer to achieve the desired properties in the cured and bonded polymer.

BRIEF DESCRIPTION OF THE DRAWINGS

The invention will be better understood by reference to the drawings wherein like numbers denote like parts throughout and wherein.

DETAILED DESCRIPTION OF THE PREFERRED EMBODIMENT

Figure 1:
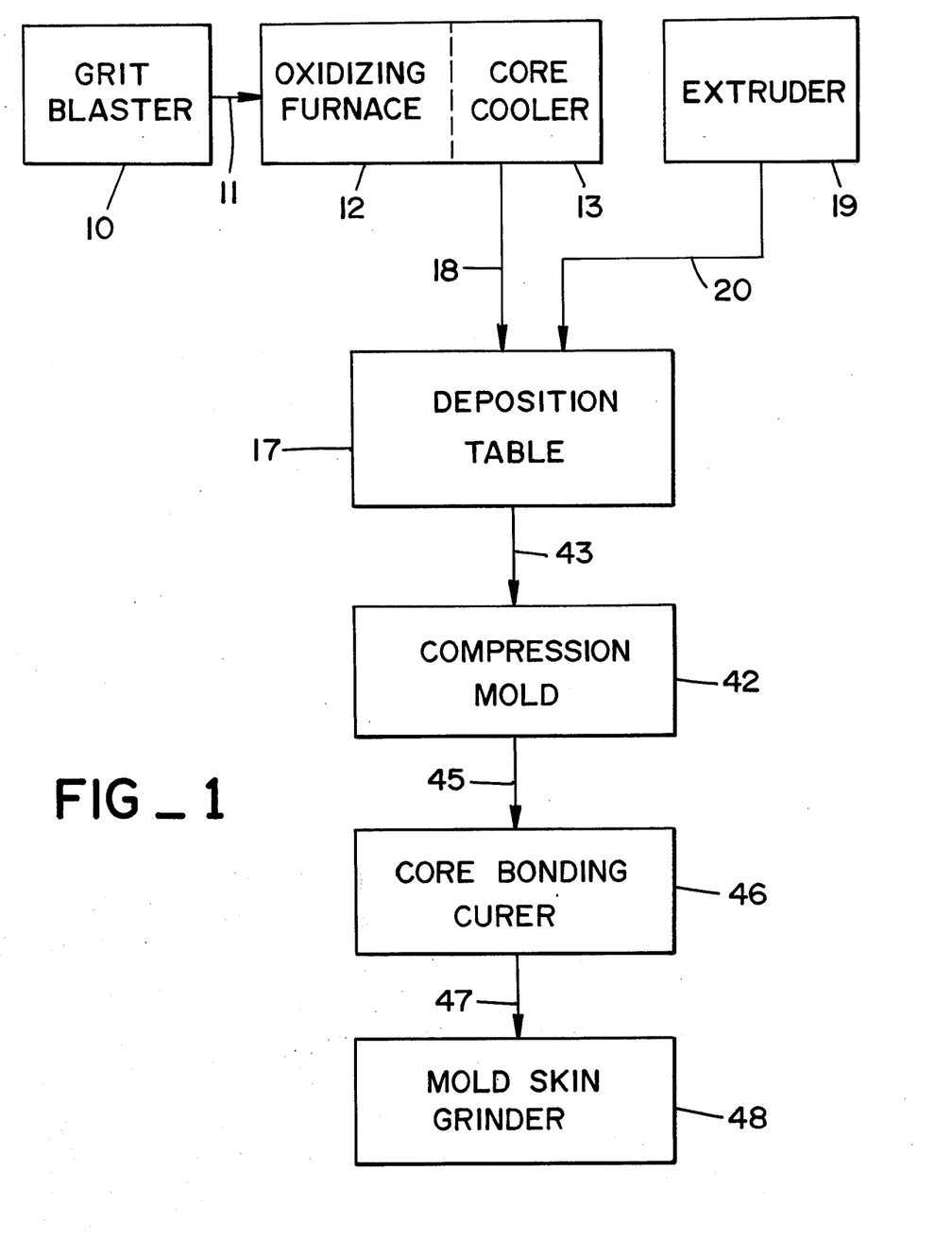
FIG. 1 illustrates in block diagram form the process and apparatus of the present invention.

Referring now particularly to the drawings of the invention and most particularly to FIG. 1, there is schematically illustrated a conventional grit blaster 10 wherein a surface of a metal substrate is roughened preparatory to bonding thereto. Therefrom, as represented by the line 11, the substrate proceeds to an oxidizing furnace 12. In the oxidizing furnace 12 the roughened bonding surface of the metal substrate is controllably oxidized at a temperature below the tempering temperature of the substrate and sufficient to cause formation of an oxide layer on the roughened bonding surface, FeO and/or $Fe_3O_4$ in the case of an iron based alloy. The oxidizing furnace 12 is then followed by a core (metal substrate) cooler 13 which may be a zone of lower temperature within the oxidizing furnace.

Figure 2:
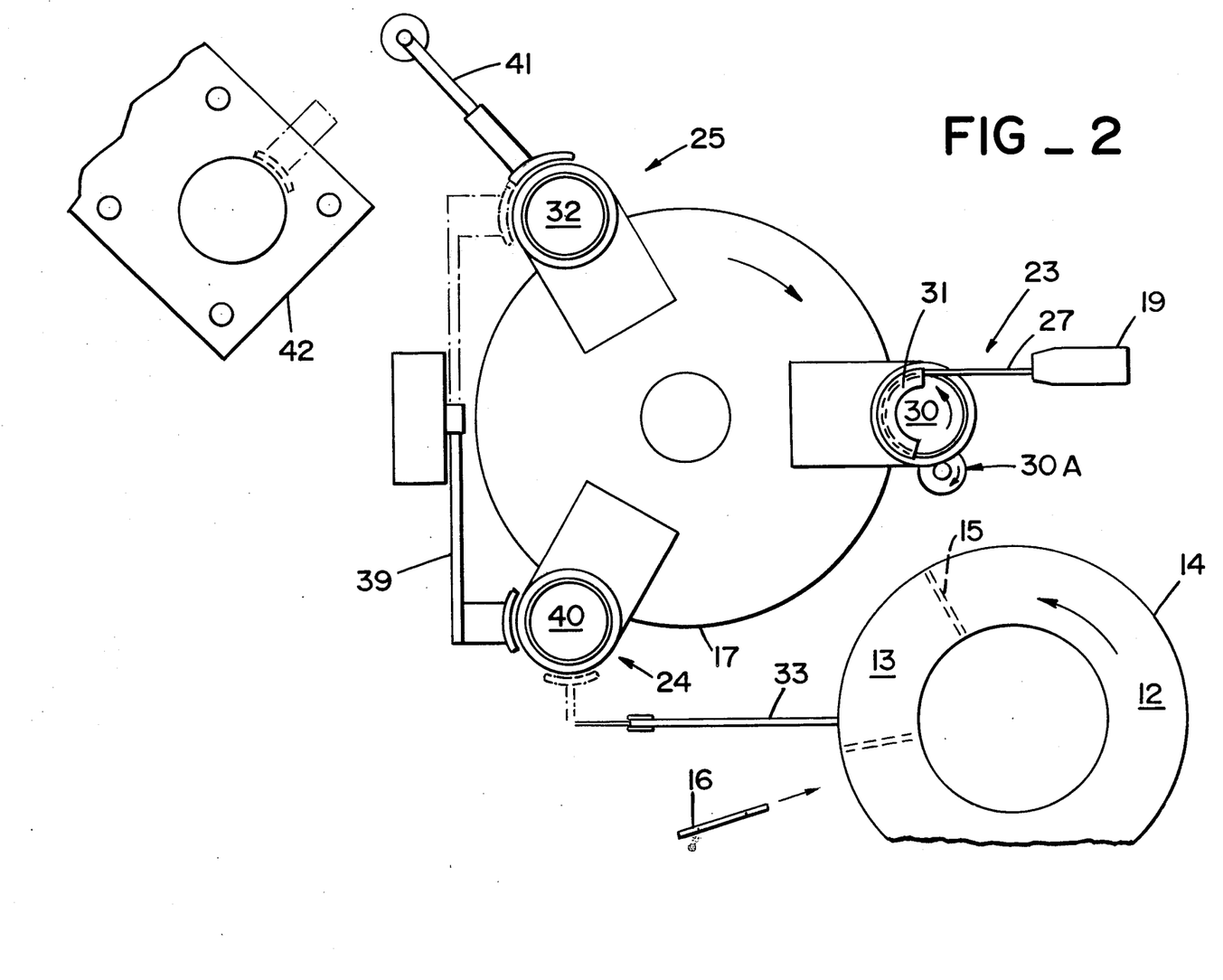
FIG. 2 illustrates schematically the process and apparatus of the present invention with the exception of the conventional grit blaster, core bonding and curing unit and mold skin grinder.
Figures 3, 4:
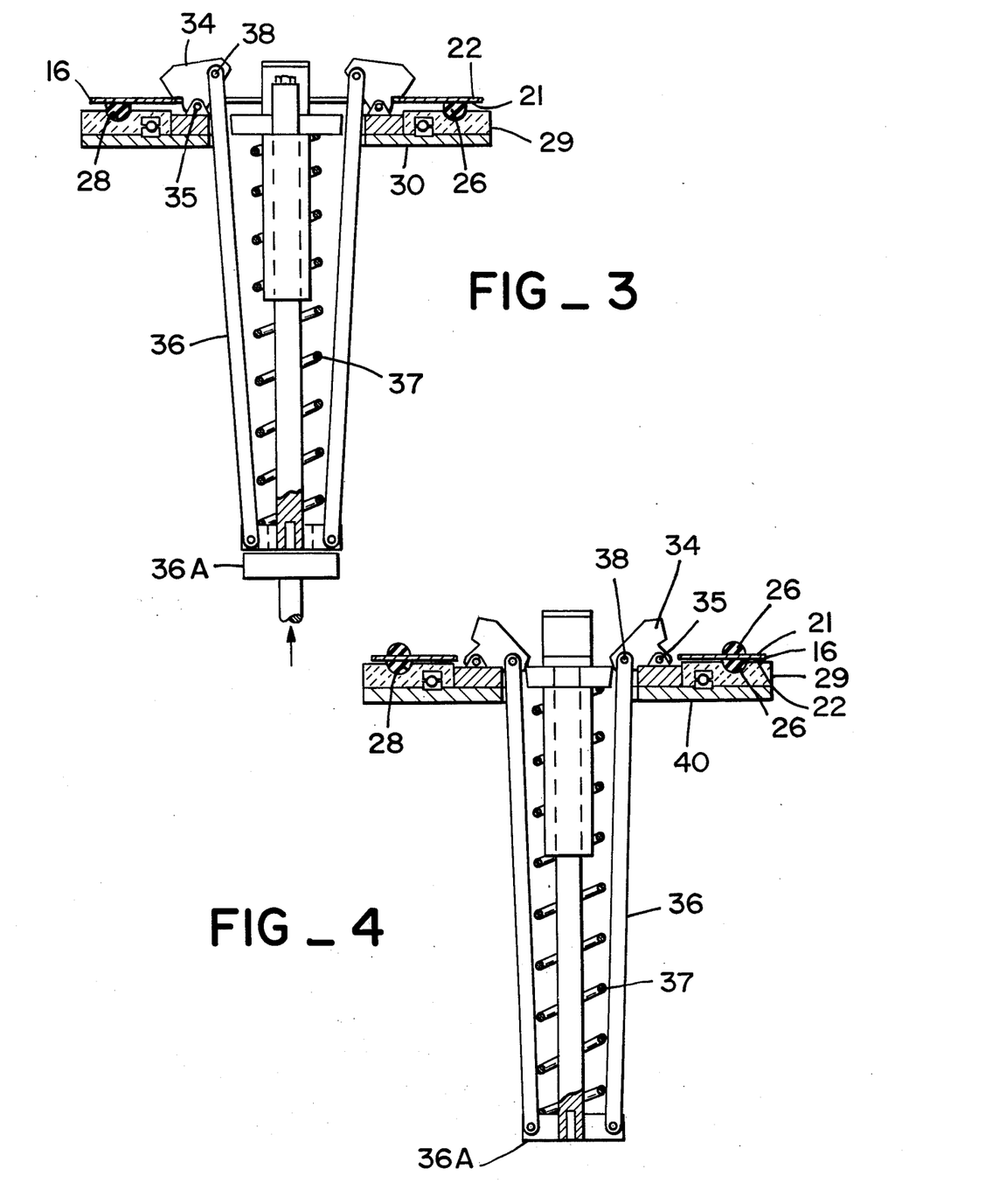
FIGS. 3 and 4 illustrate details in the operation of the process and apparatus of FIG. 2.

FIG. 2 illustrates the oxidizing furnace 12 and the core cooler 13 within a single shell 14, the core cooler 13 being separated from the oxidizing furnace 12 as by an air curtain 15. A plurality of cores 16 (metal substrates) generally travel through the oxidizing furnace 12 and thence through the core cooler 13 moving in the direction shown by the arrow. Individual cores 16 are then removed from the core cooler 13 generally at a temperature of about 215°C and introduced onto a deposition table 17 as represented in FIG. 1 by a line 18. On deposition table 17, the operation of which is illustrated most clearly in FIGS. 2, 3 and 4, fluoroelastomer extrudate from an extruder 19 is introduced, as represented by line 20, at a temperature generally of about 100°C onto a roughened bonding surface of one of the cores 16. In the preferred embodiment as illustrated, the core 16 has two roughened bonding surfaces 21 and 22 and fluoroelastomer extrudate is adhered to each of these two roughened bonding surfaces 21 and 22, the fluoroelastomer first being placed against one of the roughened bonding surfaces, e.g., 21, to which it adheres, the core then being flipped over and the fluoroelastomer being placed against the other of the two bonding surfaces, e.g., 22. Deposition of the fluoroelastomer extrudate onto the roughened bonding surfaces 21 and 22 of the core 16 is represented by line 20 of FIG. 1.

Adherence of the fluoroelastomer extrudate to the two bonding surfaces 21 and 22 proceeds as follows: the deposition table 17 is rotatable about a central axis and has three fixed stations thereabout each 120° apart indicated generally by 23, 24 and 25. At the first station 23, fluoroelastomer extrudate in the form of a wire 26 is extruded from the extruder 19 via a guideway 27 into a hemicircular groove 28 formed in a guide ring 29, generally made of Teflon, (a Trademark of E. I. du Pont de Nemours & Company) or a pyroceramic material.

The guide ring 29 is attached to a first rotatable platform 30 which generally rotates about a central axis thereof driven by a drive motor and wheel 30A at a rate somewhat greater than the rate of extrusion of the wire 26 from the extruder 19 thereby tending to urge the extrudate ino the hemicircular groove 28. The guideway 27 includes an arcuate portion 31 with a groove therein which matches the hemicircular groove 28 and is positioned immediately there-adjacent to form a tubular channel into which the wire 26 is introduced by the extruder 19. After a complete torus of the wire 26 has been placed in the groove 28, the wire 26 is cut and the feed from the extruder 19 is temporarily halted while the drive linkage for rotating the platform 30 about its axis is likewise temporarily halted. The table 17 then rotates as illustrated by the arrow in FIG. 2, 120° to place the first platform 30 at the second station 24.

Once the table 17 has rotated to the second station 24 extrusion of a wire 26 via a guideway 27 to a circular groove 28 formed in a guide ring 29 occurs again at the first station 23, this time into a circular groove 28 in a guide ring 29 on a second platform 32. Meanwhile, a core 16 is removed by a first transfer arm 33 from the core cooler 13 is placed atop the guide ring 29 of the first platform 30 which is now at the second station 24. Thereby, the bonding surface 21 of the core 16 is placed in contact with a toroidal wire 26 of extrudate which is held in the circular groove 28 of the first platform 30 at the second station 24. Immediately thereafter a plurality of dogs 34 rotate downwardly about a plurality of pivots 35 as a plurality of actuating links 36 are forced upwardly generally by action of a conventional pneumatic cylinder (not illustrated) upon a head 36A against the force exerted by a spring 37. The links 36 are rotatingly attached at a plurality of axles 38 to the plurality of dogs 34. This causes the dogs 34 to push downwardly upon the upfacing side of the core 16 and thereby causes the bonding surface 21 of the core 16 to lightly press against the top of the wire 26 whereby the wire 26 adheres to the bonding surface 21. Then, the links 36 are moved downwardly as the pneumatic piston retreats whereby the dogs 34 swing back and release the core 16 and a second transfer arm 39 picks up the core 16 and transfers it from the first platform 30 at the second station 24 to the third platform 40 which is now at the third station 25 meanwhile reversing the top and bottom sides of the core 16 whereby at the third station 25 the formerly downfacing side of the core 16 becomes the upfacing side thereof and vice versa. A complete torus of the wire 26 will be on the third platform 40 at the third station 25 having been previously placed thereon when the third platform 40 was at the first station 23, whereby the bonding surface 22 of the core 16 will contact the torus of the wire 26. The third platform 40 and the second platform 32 as well are constructed identically to the first platform 30 and a plurality of dogs 34 are forced down upon the upfacing side of the core 16 thereby aiding the toroidal wire 26 to adhere to the bonding surface 22 of the core 16 and are than released as at the first platform 30. Thus, the core 16 at the third station 25 has one torus of the extrudate wire 26 on the bonding surface 21 thereof and has a second torus of the extrudate wire 26 on the other bonding surface 22 thereof. From the third station 25, a third transfer arm 41 picks up the core 16 and transfers it to the press or compression mold 42. Thereafter, the table rotates an additional 120° and the process proceeds continuously as described above with two tori of wire 26 being placed on adjacent of the platforms 30, 32 and 40 at the first station 23, the adjacent platforms being rotated to be at the second and third stations 24 and 25, and adhering of the wire 26 to the bonding surfaces 21 and 22 occurring as the first of the next two tori of wire 26 is deposited at the first station 23.

The table 17 proceeds as in the manner described at a necessarily relatively high rate of rotation. The high rate is necessitated because from the moment when the hot core 16 first contacts the torus of the extrudate wire 26 to the time when the mold faces in the compression mold 42 come together to simultaneously heat and compress the two tori of the extrudate wire 26 one against each of the bonding surfaces 21 and 22 of the core 16 to thereby simultaneously bond the extrudate to the metal surfaces 21 and 22 and cure the extrudate at a comparable rate, no more than about 2 minutes, preferably no more than about 1 minute and more preferably still not more than about 0.5 minutes should have past. As discussed above, if the total elapsed time between the adhering of the first of two tori of the extrudate wire 26 onto the roughened bonding surface 21 exceeds these time limits, inferior bonding results with blistering and the like appearing beneath the portion of the bond whereat the extrudate wire 26 first contacted the bonding surface 21.

From the deposition table 17, the core 16 with the fluoroelastomer wire 26 adhering to the bonding surfaces 21 and 22 thereof is transferred as represented by the line 43 to the compression mold 42. The compression mold 42 operates in a conventional manner with a pair of faces 44 thereof coming towards each other and compressing the fluoroelastomer wire 26 against the mold faces 44. The mold faces 44 are cleaned as needed generally on each opening thereof, by washing with mold release agents and/or by air blasting.

After the core 16 is removed from the compression mold 42, it generally passes as represented by line 45 to a core bonding curer 46 wherein postcuring of the fluoroelastomer layer and of the direct bond therefrom to the metal substrate bonding surface is carried out.

Thereafter, the core 16 with the fluoroelastomer bonded to the surfaces 21 and 22 thereof passes as represented by line 47 to the mold skin grinder 48. The mold skin grinder is a conventional apparatus and simply serves to remove, by controlled grinding, the small skin or top portion of the fluoroelastomer which for reasons previously mentioned is not completely uniform in composition with the bulk of the deposited fluoroelastomer.

Figure 5:
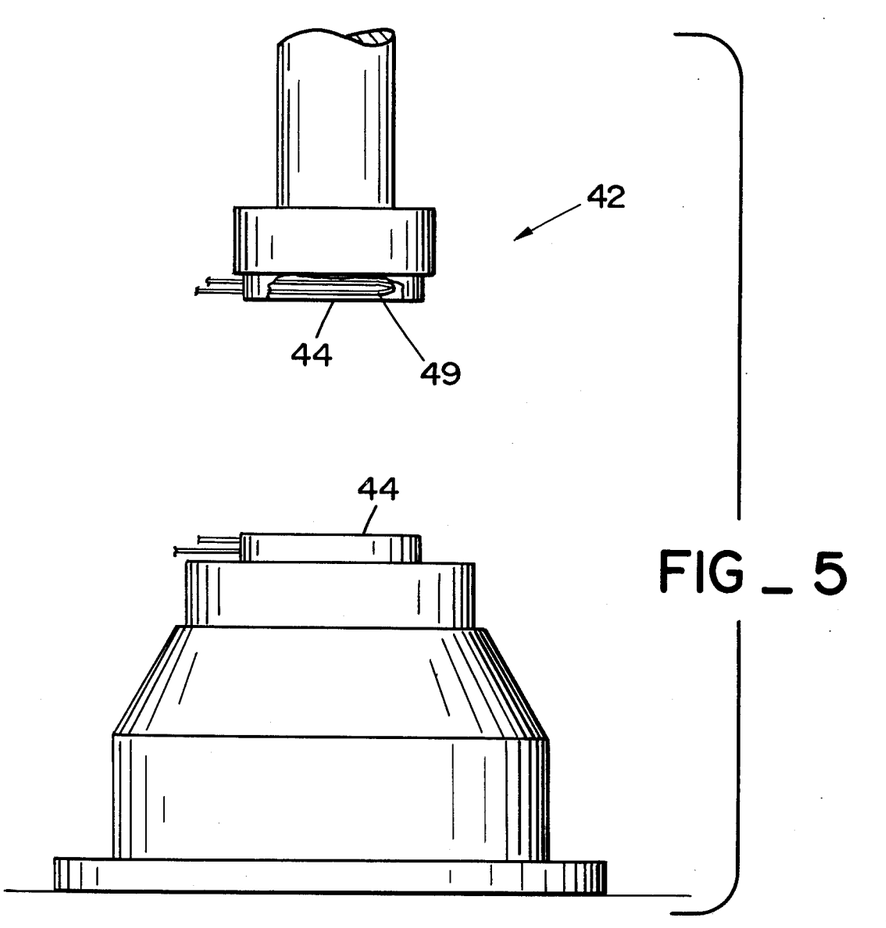
FIG. 5 illustrates in side elevation a compression mold of the invention.
Figure 6:
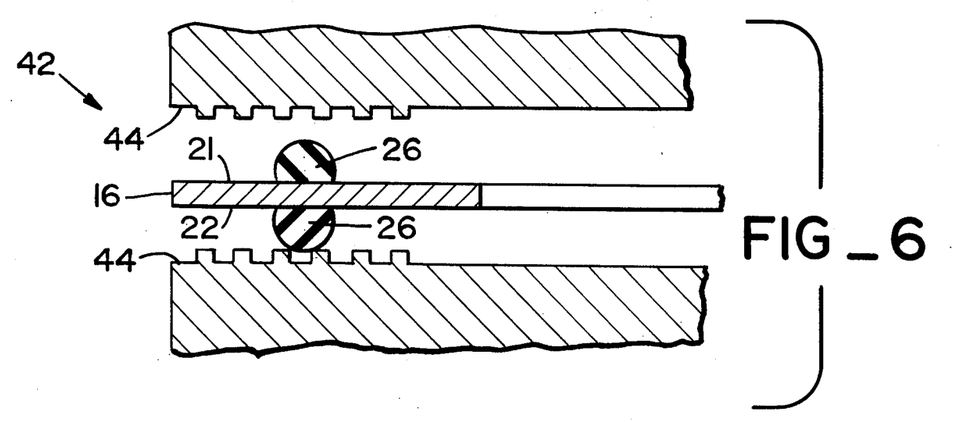
FIG. 6 illustrates a pair of mold faces about to compress fluoroelastomer onto two roughened bonding surfaces, one on each side of a clutch plate.

As illustrated most clearly in FIG. 5, the mold faces 44 in the compression mold 42 have electrical heating units 49 behind them with appropriate thermostatic controls to maintain the mold 42 at a desired temperature. Thus the temperature of the mold faces 44 can be controlled as desired by controlling the amount of heat applied by the heating units 49.

Further, as is pointed out, it is very important that the core 16 be very quickly moved into the compression mold 42 after the fluoroelastomer wire 26 has been adhered to the bonding surfaces 21 and 22 thereof. This is accomplished by use of the apparatus shown in FIGS. 2, 3 and 4 as previously explained.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A process for forming in a controlled manner a uniform fluoroelastomer layer directly bonded to a metal substrate, comprising:

forming a first roughened surface on one side of a metal substrate;

controllably oxidizing said substrate at a temperature sufficient to cause formation of an oxide layer on said first roughened surface and below the tempering temperature of the substrate, said oxidizing temperature being at least about 300°C;

adjusting the temperature of said substrate to a temperature above the curing temperature of the thermal setting fluoroelastomer, said fluoroelastomer comprising a copolymer of hexafluoropropylene and vinylidene fluoride, said temperature being adjusted to fall within a range from about 215° to about 175°C and being sufficient to cause relatively fast curing of said fluoroelastomer;

adhering said thermal setting fluoroelastomer in substantially uncured form and which includes a minor amount of calcium oxide homogeniously dispersed therethroughout and which is at a temperature sufficient to initiate slow curing thereof, directly onto said first surface without bonding said fluoroelastomer thereto, said fluoroelastomer being at a temperature prior to its adherence to said first surface which falls within a range from about 85° to about 115°C; and compressing said fluoroelastomer between said first surface and a first mold face maintained at a temperature within about 10°C of the temperature to which said substrate is adjusted to cure said fluoroelastomer and concurrently bond it to said first surface, said compressing being carried out at a pressure which falls within a range from about $7 \times 10^3$ kN per square meter to about $20 \times 10^3$ kN per square meter.

2. A process as in claim 1 further characterized in that said substrate includes a second side on the opposite side of the said substrate from the first side thereof and wherein said process includes the further steps of:

forming a second roughened surface on the second side of said substrate prior to said oxidizing step;

adhering another portion of said thermosetting fluoroelastomer onto said second surface after said adhering on said first surface and before said compressing; and wherein said compressing includes simultaneously compressing said second surface against a second mold face maintained at a temperature within about 10°C of the temperature to which said substrate is adjusted.

3. A process as in claim 2 further characterized in that said two adhering steps and said compressing step are completed in a total elapsed time of no more than about 2 minutes.

4. A process as in claim 3, wherein said adhering steps each comprise placing said fluoroelastomer in contact with one of said first and second surfaces and then lightly pressing said fluoroelastomer against said one of said first and second surfaces.

5. A process as in claim 4, including as an added step after said compressing step: maintaining said metal substrate with the fluoroelastomer thereon at a temperature within the range from about 175° to about 260°C for at least about 30 minutes to complete curing of said fluoroelastomer and bonding thereof to said substrate.

6. A process as in claim 5, wherein said fluoroelastomer includes from about 50 to about 150 parts per hundred parts of fluoroelastomer of glass fiber and including as an added step after said maintaining step, removing a portion of said cured fluoroelastomer from the surface thereof.

7. A process as in claim 6, wherein the amount of fluoroelastomer removed is from about 0.05 mm to about 0.15 mm.

8. An apparatus for forming in a controlled manner a uniform layer of a thermosetting fluoroelastomer directly bonded to a metal substrate, comprising:
   means for forming a first roughened surface on one side of the metal substrate;
   means for controllably oxidizing said substrate at a temperature below the tempering temperature of the substrate and sufficient to cause formation of an oxide layer on said first roughened surface;
   means for adjusting the temperature of said substrate to a temperature, T, above the curing temperature of the thermosetting fluoroelastomer;
   means for adhering said fluoroelastomer, said fluoroelastomer being at a temperature sufficient to initiate slow curing thereof and including a minor amount of CaO uniformly and homogeneously distributed therethroughout directly onto said first surface;
   a first mold face maintained at a temperature within about 10°C of T;
   means for quickly transferring said substrate to adjacent said first mold face with said first surface facing said first mold face; and
   means for compressing said fluoroelastomer between said first surface and said first mold face before said fluoroelastomer has significantly bonded to said first surface.

9. An apparatus as in claim 8 further characterized in that said fluoroelastomer includes from about 50 to about 150 parts per hundred parts of polymers of glass fibers therein, said oxidizing means operates at a temperature above about 300°C, said temperature adjusting means adjusts the temperature to fall within the range from about 175° to about 215°C, said fluoroelastomer is at a temperature within the range from about 85° to about 115°C prior to being adhered directly onto said first surface, said compressing means applies a pressure within the range from about 7 × 10³kN per sq. meter to about 20 × 10³kN per sq. meter and the total elapsed time between the placing of said fluoroelastomer directly onto said first surface and the compression of said fluoroelastomer by said compressing means comprises no more than about 2 minutes.

10. An apparatus as in claim 9 including means for forming a second roughened surface on a side of said metal substrate opposite said first side thereof; means for adhering said fluoroelastomer directly onto said second surface before said compressing; and a second mold face maintained at a temperature within about 10°C of the adjusted temperature of said substrate opposite said first mold face.

11. An apparatus as in claim 10 including means for turning over said substrate after said fluoroelastomer has been directly adhered onto said first surface and prior to said fluoroelastomer being directly adhered onto said second surface.

12. An apparatus as in claim 11 including means for maintaining said substrate with said fluoroelastomer compressed thereupon at a temperature which falls within the range from about 175° to about 260°C for at least about 30 minutes.

13. An apparatus as in claim 12 including means for removing a portion of said cured fluoroelastomer from a surface thereof.

* * * * *